June 14, 1960

D. R. WHITE 2,940,884

ADHESIVE TAPE

Filed March 30, 1956

INVENTOR

DEANE ROWLAND WHITE

BY John Ellsworth Griffiths

ATTORNEY

United States Patent Office 2,940,884

Patented June 14, 1960

2,940,884

ADHESIVE TAPE

Deane Rowland White, Colonia, N.J., assignor to E. I. du Pont de Nemours and Company, Wilmington, Del., a corporation of Delaware Filed Mar. 30, 1956, Ser. No. 575,079

2 Claims. (Cl. 154—53.5)

This invention relates to pressure-sensitive tape and more particularly as a new article of manufacture to pressure-sensitive tape having recurring adhesive areas and non-adhesive areas. Still more particularly, it relates to a novel pressure-sensitive tape especially adapted for use in splicing and patching motion picture and sound recording films.

An object of this invention is to provide a new pressure-sensitive splicing tape. Another object is to provide a pressure-sensitive splicing tape which is easy and economical to manufacture. Still another object is to provide such a tape with no exposed tacky adhesive areas, but with adhesive areas which can readily be made available to provide a convenient adhesive patch or strip. Yet another object is to provide such a patch which can be applied to a surface by hand without the tacky adhesive coming into contact with the fingers. A more specific object is to provide such a patch in the form of a short thin strip particularly adapted for use in splicing or patching sections of motion picture and sound record films.

In one important aspect of this invention, the pressure-sensitive tape is in the form of a long or continuous article consisting of recurring units of individual patches. This continuous article comprises a narrow transparent web having on at least one surface recurring pressure-sensitive adhesive areas and non-adhesive areas, which areas are in turn covered by a protective web in contact with the adhesive and non-adhesive areas. The non-adhesive areas are formed by placing covering pieces or tabs of thin sheet material on the adhesive layer on the web. Over the series of adhesive and non-adhesive areas on the web is positioned a continuous protective web of approximately the same dimensions as the first web, said protective web being adherent to the adhesive areas and extending over the non-adhesive areas. For convenience, this continuous tape can be wound in the form of a roll which may have a center core or mandrel if desired.

In another important aspect of this invention, the pressure-sensitive splicing or patching tape is in the form of a short strip of transparent web having on one surface a pressure-sensitive adhesive area and having a non-adhesive area adjacent the adhesive area on at least one end of the strip and having on the adhesive surface of the strip a protective web adherent to the adhesive area and extending over the non-adhesive area or areas. The article of this aspect of the invention may be made as a separate integral patching tape, or it may be conveniently obtained from the continuous tape described above by severing the continuous tape transversely through the penultimate non-adhesive area of the continuous tape.

The pressure-sensitive tapes of this invention will now be described with reference to the accompanying drawing which constitutes a part of the present application in which similar numerals refer to similar parts through the several views wherein.

Figure 1:
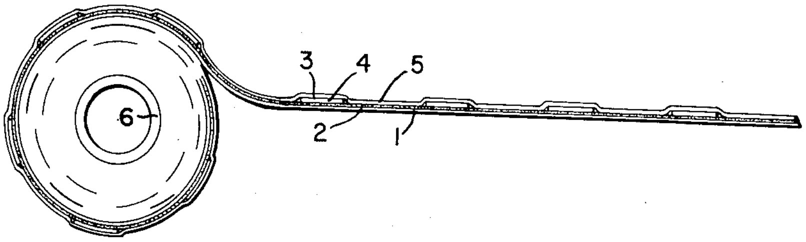
Fig. 1 is an elevation view of a continuous tape according to this invention with one end of the tape in roll form.
Figures 2, 3:
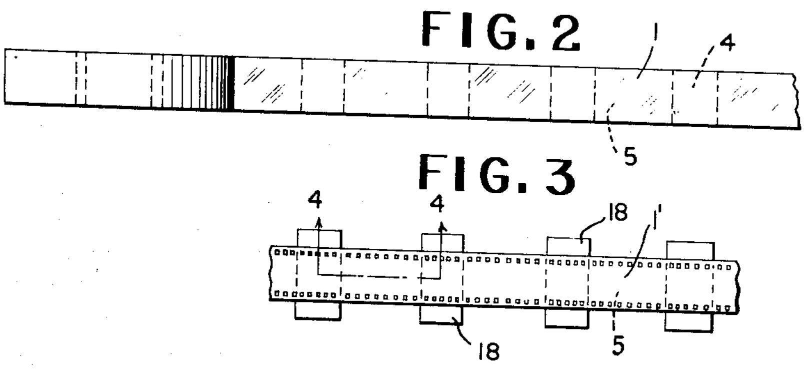
Fig. 2 is a plan view of a continuous tape according to this invention with one end of the tape in roll form.
Fig. 3 is a plan view of a modified preferred embodiment of a continuous perforated tape according to this invention.

Referring now to the drawing, the continuous tape as shown in Figures 1 through 3 comprises a thin narrow transparent flexible web 1 having coated thereon a thin layer of pressure-sensitive adhesive 2. At spaced intervals along the web, small non-adhesive areas 3 occur, which areas are rendered non-adhesive by covers of thin sheet material 4 adhering to the adhesive side of the web. Over the web with its adhesive and non-adhesive areas is positioned a removable protective sheet or web 5. In continuous form the tape may be wound on core 6.

Figure 4:
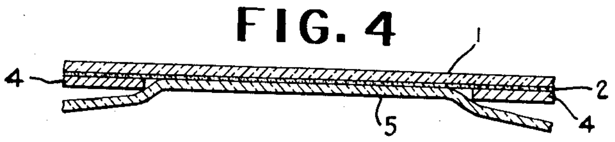
Fig. 4 is an elevation view in section taken along 4—4 of Fig. 3 of a preferred embodiment of an integral single patching tape according to this invention.

As shown in Fig. 4, a preferred embodiment of an integral single patch or strip of tape according to this invention may consist of a short length of thin narrow, transparent flexible web 1 having on one surface a pressure-sensitive adhesive coating 2. At each end of the web, a non-adhesive area is provided by the addition of small covering pieces 4 in the manner described above. A protective web 5 is positioned adherent to the adhesive area and extending over the non-adhesive areas. Although the preferred embodiment is shown in Fig. 4, the non-adhesive area need not be at both ends of the web 1. A single non-adhesive area at only one end of the web would be sufficient, as long as at least one adhesive-free portion is presented to facilitate separating and stripping the protective web from the adhesive-coated web and to serve as a non-tacky projection which the user may grasp.

Figure 5:
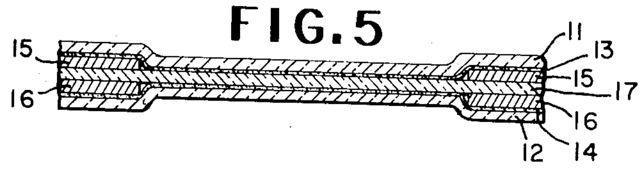
Fig. 5 is an elevation view in section of an embodiment of an integral double patching tape according to this invention.

As shown in Fig. 5, an integral double patching tape according to this invention may consist of two thin narrow, transparent flexible webs 11 and 12, each having a respective pressure-sensitive adhesive coating 13 and 14. Non-adhesive areas are provided by covering pieces 15 and 16 at each end of the respective webs. A protective web 17, common to both adhesive-coated webs 11 and 12, is positioned adherent to the adhesive areas and extending over the non-adhesive areas. Although the preferred embodiment of an integral double patching tape is shown in Fig. 5, non-adhesive areas at only one end of the webs 11 and 12 would be sufficient, as stated in the preceding paragraph. Double patching tapes may of course be constructed in continuous form which for convenience may be in roll form.

The covering pieces or tabs 4, 15 and 16 may be of approximately the same size as the width of the adhesive coated web, for example as shown in Fig. 2, or they can be wider, for example as shown in Fig. 3, with part of the covering pieces of sheet material extending in projections 18 from the sides of the web 1'. These projections may extend from one or both sides, and are considered to add to the ease of manufacture and convenience in handling.

Application of the pressure-sensitive tape is accomplished in the following manner. An integral patching tape, which may be cut from the continuous tape, is prepared for application by stripping the protective web from the tape. The user then grasps the non-adhesive area or areas of the tape by the fingers and places the strip, adhesive side down, on the desired object or objects, e.g., on the adjoining ends of the two segments of the film to be spliced or on a segment of cracked or torn film.

The strip or patch may be smoothed down with the fingers to obtain smooth bubble-free adherence. The non-adhesive area or areas at the end or ends of the strip are then removed by cutting the strip transversely with a scissors or other suitable instrument. In the case of the integral double patching tape, the stripping operation may be repeated, thus obtaining a second strip or patch.

The invention will be further illustrated but is not intended to be limited by the following examples of preferred embodiments.

*Example I*

A transparent polyethylene terephthalate web 16 mm. wide, one mil thick and several yards long having a thin layer of pressure-sensitive adhesive coating on one surface of the web and having cine perforations along one edge of the web corresponding to the perforations in 16 mm. sound motion picture film was placed adhesive side up on a supporting table. Covering pieces of ordinary bond paper 0.90 inch by approximately 1.125 inches were placed on the adhesive coated side of the web symmetrically and orthogonally along the length of the web with the longest dimension of the covering pieces transverse to the longest dimension of the web, with the edge of each covering piece alined with a web perforation and a distance of 1.2 inches between each covering piece. A protective web of unperforated polyethylene terephthalate 0.625 inch wide was pressed evenly along the adhesive coated web and covering pieces. The continuous tape thus formed was wound onto a cardboard core having an inside diameter of one inch. A short integral strip of tape was obtained by severing the tape transversely through the approximate center of the penultimate covering piece in the roll. Excellent splices and tear repairs were made on 16 mm. sound motion picture film by applying the tape in the manner described above.

*Example II*

A roll of tape was prepared of the same material and in the same manner as in Example I except that the adhesive coated web and protective web were both 0.875 inch wide and unperforated. The covering pieces were 0.75 inch by 1.375 inches and the distance between pieces was 1.5 inches. Separate integral tapes were formed by cutting the continuous tape transversely through the covering pieces. Excellent splices and tear repairs were made on 35 mm. motion picture film by applying the tape in the manner described above.

The covering pieces of sheet material which are used to render an area non-adhesive may be of any convenient size, preferably sufficiently small to avoid unnecessary waste of the covering material and of the adhesive coated web.

The web bearing the adhesive coating may consist of a web of any strong thin sheet material. When the tape is to be used in the splicing of motion picture or sound recording film, the tape should be of transparent material such as cellulose derivatives, e.g., cellulose acetate, cellulose propionate; or regenerated cellulose, e.g., cellophane or a superpolymer, e.g., polystyrene, polyvinyl chloride, poly(vinylchloride co vinylacetate), nylon, polyesters, e.g., the polymethylene terephthalates disclosed in Whinfield and Dickson U.S. Patent 2,465,319 including polyethylene terephthalate or a vinylidine chloride copolymer. Hydrophobic films, especially of polyethylene terephthalate, constitute preferred webs.

Any of the usual tacky adhesives are useful for the pressure-sensitive adhesive layer. Preferably such adhesives should be transparent when the patches are to be used for splicing motion picture film. Some suitable adhesives are described in Drew U.S. Patent 2,177,627.

The transverse cover pieces of thin sheet material used to render the adhesive surface non-adhesive may likewise be of any materials listed above, but since it is not necessary that they be transparent, they may also consist of such thin materials as paper, foil, fabric, etc.

The strippable protective web can be made of any of the film or covering piece materials listed above. Its composition is not critical since it is discarded after stripping. The surface of the protective web may be coated with a release agent, e.g., polyethylene, polytetrafluoroethylene or a silicone or wax, to facilitate its removal from the adhesive surface.

In the splicing of motion picture and sound recording film, the tape of this invention may be applied to cine perforated or non-perforated films. For application to cine perforated films, the pressure-sensitive tape may contain perforations which are preferably of the same size and spacing as in the film to be spliced, or the tape may be non-perforated and of a width sufficiently narrow to fit between the perforations in the film. The tape may be constructed from a cine perforated pressure-sensitive adhesive-coated web and non-perforated cover pieces and protective web, or the tape may be first made in integral or continuous form from non-perforated materials, followed by a single punching operation to form cine perforations in all elements of the tape.

The pressure-sensitive tape of this invention may be packaged in roll form, or a number of short integral strips may be boxed or otherwise packaged in convenient numbers and sizes. It is also possible that several integral splicing or patching tapes may be included in a package of motion picture or sound recording film. The tape may be in the form of any convenient number of end-to-end integral patches, e.g., 1, 2, 3, 4 or more, as in the continuous form described above.

An outstanding advantage of the continuous tape according to this invention lies in the fact that an integral patching tape can be quickly severed from the continuous tape by cutting transversely through the penultimate non-adhesive area of the continuous tape. This is especially advantageous when the tape is of the preferred material, polyethylene terephthalate, which is of such strength that it cannot be readily torn or ripped, even when scored to facilitate severance. Since, in this preferred instance, severance must be accomplished by means of a scissors, razor blade, or similar cutting instrument, it is time-saving and otherwise advantageous that the cut need not be carefully made, on a specific line, etc., but can be at an angle, crooked and even jagged, as long as the cut is through the non-adhesive area.

An additional outstanding advantage of the tape according to this invention is that, after application of the tape to an object, such as the adjoining ends of two sections of film to be spliced or a film to be repaired, the non-adhesive areas are removed by transverse severance along the juncture of the adhesive area and the non-adhesive area. This severance must be particularly straight and accurate in the splicing of motion picture film. Accuracy is greatly facilitated in the tape of this invention since the transverse covering piece forms with the non-adhesive area a distinct juncture line which is easily and readily followable with a cutting instrument.

An additional advantage of the tape of this invention is that it is simple in construction and easy and economical to manufacture. Another advantage is that the tape can be handled by a user without contact with any tacky adhesive surface of the tape. Yet another advantage is that the tape can be readily disassembled to provide a convenient adhesive strip. A further advantage is that a splicing strip of particular convenience for joining sections of motion picture and sound recording film is provided which can be used directly or in conjunction with a simple positioning device including positioning devices now incorporated in a number of splicing machines known to the art. A suitable splicing machine is disclosed in Drummond U.S. application Serial No. 523,170, filed July 20, 1955, now Patent No. 2,794,489. Still other advantages will be apparent from the above description.

The invention claimed is:

1. A splicing tape comprising (a) A thin narrow transparent flexible web having cine perforations along at least one longitudinal edge, (b) A coating of pressure sensitive adhesive on said flexible web, (c) A plurality of thin tabs, (1) One surface of each of said tabs, for the entire part of said one surface positioned between the lateral edges of said web, being in adhesive contact with said adhesive coating and fixedly adherent thereto, (2) Said tabs extending transversely across at least the entire width of said web, (3) And said tabs positioned at uniformly recurring spaced intervals along the longitudinal axis of said web, (d) And a thin continuous protective web overlying said tabs and said adhesive coating and in adhesive contact with said adhesive coating between all of said tabs.

2. A splicing tape as set forth in claim 1 wherein said flexible web is composed of polyethylene terephthalate approximately one mil in thickness.

References Cited in the file of this patent

UNITED STATES PATENTS

| | | |
|---|---|---|
| 986,655 | Taylor | Mar. 14, 1911 |
| 2,133,609 | Eustis | Oct. 18, 1938 |
| 2,329,527 | Golub | Sept. 14, 1943 |
| 2,506,933 | Mercer | May 9, 1950 |
| 2,649,199 | Werman | Aug. 18, 1953 |
| 2,651,588 | Bruce et al. | Sept. 8, 1953 |
| 2,679,968 | Richter | June 1, 1954 |
| 2,725,322 | Muttera | Nov. 29, 1955 |